United States Patent
Mayhew et al.

(10) Patent No.: US 6,243,063 B1
(45) Date of Patent: Jun. 5, 2001

(54) DIFFRACTIVE SPATIAL LIGHT MODULATOR AND DISPLAY

(75) Inventors: Nicholas Mayhew, Oxford; Michael Geraint Robinson; Craig Tombling, both of Stadhampton, all of (GB); Mitsuhiro Koden, Kashiwa (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/094,461

(22) Filed: Jun. 10, 1998

(30) Foreign Application Priority Data

Jun. 12, 1997 (GB) .................................. 9712134

(51) Int. Cl.$^7$ ...................................... G09G 3/36
(52) U.S. Cl. ...................... 345/94; 345/87; 345/97
(58) Field of Search ...................... 345/87, 88, 89, 345/94, 95, 96, 97, 98, 99, 100, 208, 209, 210; 349/128, 133, 134, 201

(56) References Cited

U.S. PATENT DOCUMENTS

| | | | |
|---|---|---|---|
| 5,552,916 | 9/1996 | O'Callaghan et al. | 359/95 |
| 5,825,448 | * 10/1998 | Bos et al. | 349/128 |
| 5,986,740 | * 11/1999 | Robinson et al. | 349/201 |

FOREIGN PATENT DOCUMENTS

| | | |
|---|---|---|
| 0378293 | 7/1990 | (EP) . |
| 706169A1 | 10/1996 | (EP) . |
| 2313920 | 12/1997 | (GB) . |
| 2315858 | 2/1998 | (GB) . |

OTHER PUBLICATIONS

K. Asakura et al., Optics Letters, vol. 17, No. 5, pp. 366–368, 1992, "Stripe Electrodes for an Electrically Controlled Gray Scale in Ferroelectric Liquid–Crystal Devices".

J. A. M. M. van Haaren et al., Liquid Crystals, vol. 16, No. 5, pp. 735–748, 1994, "Switching on Stray Electric Fields in Ferroelectric Liquid Crystal Cells".
P. W. H. Surguy et al., Ferroelectrics, vol. 122, pp. 63–79, 1991, "The 'Joers/Alvey' Ferroelectric Multiplexing Scheme".
J. R. Hughes et al, Liquid Crystals, vol. 13, No. 4, pp. 597–601, 1993, "A New Set of High Speed Matrix Addressing Schemes for Ferroelectric Liquid Crystal Display".
Nordin et al., Journal of Applied Optics, vol. 34, No. 19, pp. 3756–3763, "Liquid Crystal on Silicon Implementation of the Partial Pixel 3–D Display Architecture".
Kowel et al., Proceedings of the SPIE, vol. 2651, 1996, pp. 56–67, "High Resolution Diffraction Gratings".
M. J. O'Callagham et al., Optics Letters, vol. 16, No. 10, pp. 770–772, 1991, "Diffractive Ferroelectric Liquid–Crystal Shutters for Unpolarized Light".
M. A. A. Neil et al., Electronics Letters, vol. 30, No. 5, pp. 445–446, 1994, "Improved Transmission in a Two–Level, Phase–Only, Spatial Light Modulator".
Handschy, Mark A., et al.; Analog Electro–optic modulators for ferroelectric–liquid–crystal/VLSI spatial light modulators; *SPIE*; vol. 1911; p. 175–180; Feb. 2, 1993.

* cited by examiner

*Primary Examiner*—Xiao Wu
(74) *Attorney, Agent, or Firm*—Renner, Otto, Boisselle & Sklar

(57) ABSTRACT

A diffractive spatial light modulator of the present invention includes a plurality of picture elements, each of the plurality of picture elements, comprises a plurality of first elongate parallel electrodes, a plurality of second elongate parallel electrodes interdigitated with the first electrodes and a third electrode, facing the first and second elongate parallel electrodes; and an address signal generator connected to the first and second elongate parallel electrodes and arranged to supply addressing signals for selectively switching each of the plurality of picture elements, picture element to any one of a non-diffractive state and a plurality of diffractive states of different diffraction efficiencies.

23 Claims, 14 Drawing Sheets

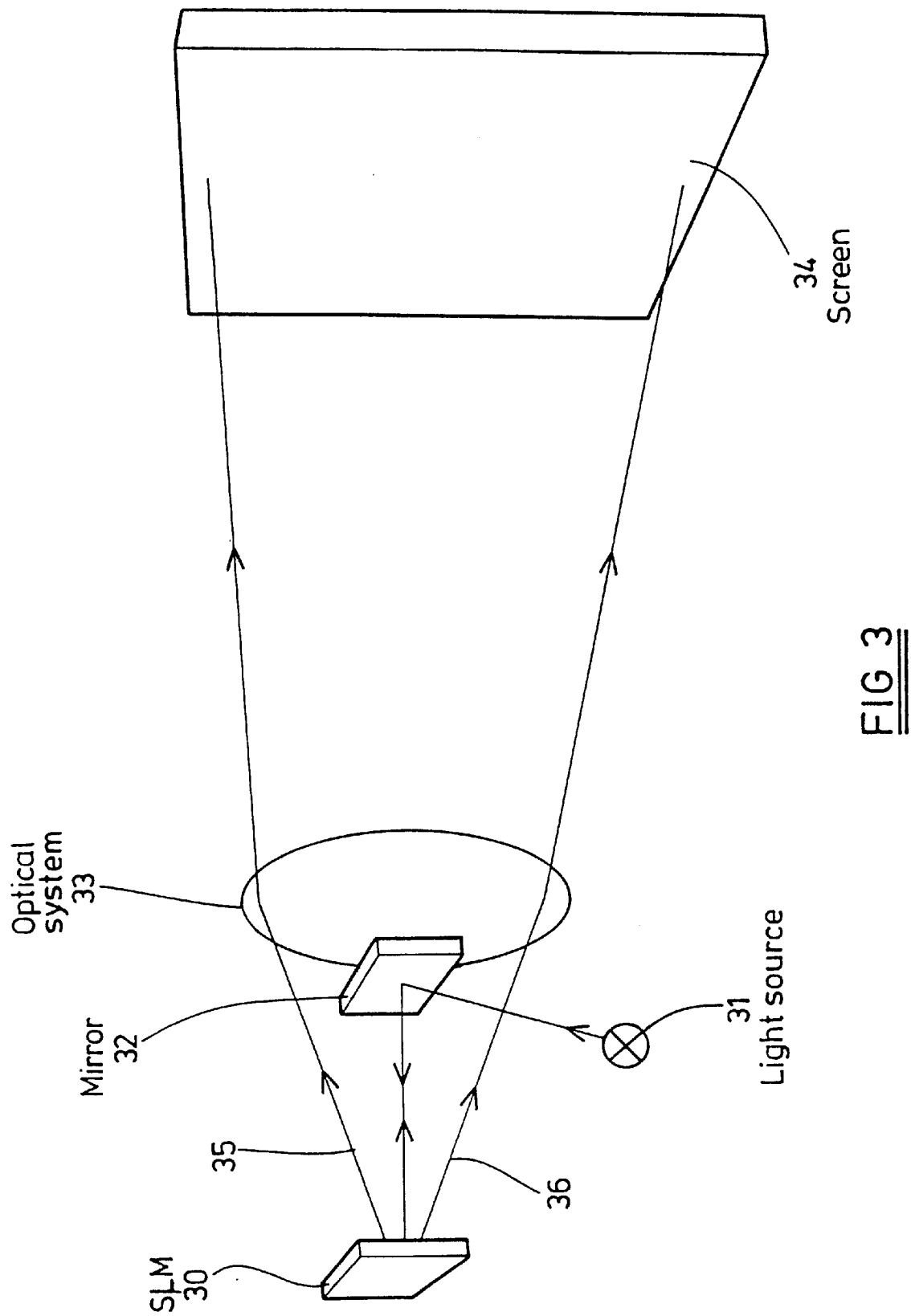

$V_{pad} = (V_1 + V_2)/2$ $V_{Pad} < (V_1 + V_2)/2$

Reduced switching angle 65

DIFFRACTIVE SPATIAL LIGHT MODULATOR AND DISPLAY

TECHNICAL FIELD OF THE INVENTION

The present invention relates to a diffractive spatial light modulator and to a display incorporating such a modulator. Such a display may be of the projection type and may be used to provide large screen TV viewing and business presentations.

DESCRIPTION OF THE RELATED ART

A spatial light modulator using ferroelectric liquid crystal technology is disclosed in a paper entitled "Diffractive Ferroelectric Liquid Crystal Shutters for Unpolarised Light" by M. J. O'Callaghan and M. A. Handschy, Optics Letters, Volume 16 No.10, May 1991, pages 770 to 772. The spatial light modulator disclosed in this paper is switchable between a first state in which it transmits incident light and a second state in which it acts as a phase diffraction grating.

Another spatial light modulator is disclosed in a paper entitled "Improved Transmission in a Two-Level, Phase Only, Spatial Light Modulator" by M. A. A. Neal and E. G. S. Page, Electron. Lett. 30 (5) pages 465–466 1994. This paper discloses a spatial light modulator which is switchable between a transmissive mode and a diffractive mode in which alternative strips of the modulator rotate unpolarised light by plus and minus 45 degrees and an associated half wave retarder further rotates all the polarisation components of the light so as to provide phase-only modulation.

FIGS. 1a and 1b of the accompanying drawings show a reflection-mode diffractive spatial light modulator (SLM) of the type disclosed in GB 9611993.8. The SLM comprises a rectangular array of rectangular or substantially rectangular picture elements (pixels), only one of which is shown in FIGS. 1a and 1b. The SLM comprises upper and lower glass substrates 1 and 2. The upper substrate 1 is coated with a transparent conducting layer of indium tin oxide (ITO) which is etched to form elongate interdigitated electrodes 3. The electrodes 3 are covered with an alignment layer 4 for a ferroelectric liquid crystal material. The alignment layer 4 may, for example, be formed by obliquely evaporating silicon oxide at 84 degrees to the normal to the substrate 1 so as to induce the C1 state in ferroelectric liquid crystal material, for instance of the type known as SCE8 available from Merck, and may have a thickness of approximately 10 nanometers. However, other types of alignment layer may be used and the C2 state may be used.

A combined mirror and electrode 5 is formed on the glass substrate 2 by depositing silver to a thickness of approximately 100 nanometers. A static quarter waveplate 6 is formed on the silver mirror and electrode 5. For example, this may be provided by spinning on a mixture of a reactive mesogen diacrylate such as that known as RM258 in a suitable solvent such as chlorobenzine with a photoinitiator. This is cured for approximately ten minutes under ultraviolet light in an atmosphere of nitrogen. The thickness of the plate 6 is controlled, for instance by varying the mix ratios of the materials and the spin speed, so that it acts as a quarter waveplate for a predetermined bandwidth in the visible spectrum, for instance centred about 633 nanometers. The thickness d is given by the expression $$d = \frac{\lambda}{4 \cdot \Delta n}$$

where $\lambda$ is the wavelength of the centre of the band and $\Delta n$ is the difference between the ordinary and extraordinary refractive indices of the material of the quarter waveplate 6. The quarter waveplate 6 therefore typically has a thickness of the order of 800 nanometers.

A further alignment layer 7 is formed on the quarter waveplate 6, for instance as described hereinbefore for the alignment layer 4. The substrates 1 and 2 are then spaced apart, for instance by spacer balls of two micrometer diameter, and stuck together so as to form a cell which is filled with the ferroelectric liquid crystal material to form a layer 8. The spacing provides a layer of ferroelectric liquid crystal material which provides a half wave of retardation so that the liquid crystal layer acts as a half wave retarder whose optic axis is switchable as described hereinafter. In particular, the ferroelectric liquid crystal layer has a thickness d given by $$d = \frac{\lambda}{2\Delta n_{FLC}}$$

where $\Delta n_{FLC}$ is the difference between the ordinary and the extraordinary refractive indices of the ferroelectric liquid crystal material.

In order to optimise the brightness of the display, the reflectivity of each interface should preferably be reduced, for instance by applying antireflection coatings to the substrate 1 and by optically burying the electrodes 3.

The electrodes 3 and 5 may be arranged to provide for suitable addressing of the pixels of the SLM. For instance, in a passive matrix addressing arrangement, the electrodes 3 may extend throughout the length of the SLM and may be connected to the outputs of a data signal generator for supplying a row of pixel data at a time to the pixels. The electrode 5 may be extended transversely to form a row electrode connected to the output of a strobe signal generator for strobing the data to the SLM a row at a time in a repeating sequence.

For each pixel, the electrode 5 acts as a common electrode which is connectable to a reference voltage line, for instance supplying zero volts, for strobing data to be displayed at the pixel. Alternate ones of the elongate electrodes 3 are connected together to form first and second sets of parallel interdigitated electrodes which are connected to receive suitable data signals. Each pixel is switchable between a reflective state and a diffractive state as described hereinafter.

FIG. 2 of the accompanying drawings illustrates diagrammatically the operation of adjacent strips of the pixel shown in FIGS. 1a and 1b when the pixel is in the diffractive mode. The optical path through each pixel is folded by reflection at the mirror 5 but, for the sake of clarity, the path is shown unfolded in FIG. 2. The SLM acts on unpolarised light, which may be split into components of orthogonal polarisations for the sake of describing operation of the SLM. One of the component polarisations is shown at 10 in FIG. 2 and is at an angle $-\phi$ with respect to a predetermined direction 11.

Voltages which are symmetrical with respect to the reference voltage on the electrode 5 are applied to the first and second sets of alternating interdigitated electrodes 3a and 3b. Thus, ferroelectric liquid crystal material strips 8a and 8b disposed between the electrodes 3a and 3b and the electrode 5 have optic axes aligned at angles of −θ and +θ, respectively, with respect to the direction 11, where θ is preferably approximately equal to 22.5 degrees.

Each strip 8a of ferroelectric liquid crystal material acts as a half wave retarder so that the polarisation of the light component leaving the strip 8a is at an angle of φ−2θ with respect to the direction 11. The light component then passes through the static quarter waveplate 6, is reflected by the mirror 5, and again passes through the static quarter waveplate 6, so that the combination of the quarter waveplate 6 and the mirror 5 acts as a half wave retarder whose optic axis is parallel to the direction 11. The polarisation direction of light leaving the quarter waveplate 6 and travelling towards the ferroelectric liquid crystal material is "reflected" about the optic axis of the quarter waveplate 13 and thus forms an angle 2θ−φ with respect to the direction 11. The light component then again passes through the strip 8a of ferroelectric liquid crystal material so that the output polarisation as shown at 14 is at an angle of φ−4θ with respect to the direction 11. Thus, for each input component of arbitrary polarisation direction −φ, the optical path through the SLM via each of the strips 8a of ferroelectric liquid crystal material is such that the polarisation direction is rotated by −4θ. This optical path therefore rotates the polarisation of unpolarised light by −4θ, which is substantially equal to −90 degrees.

Each strip 8b of ferroelectric liquid crystal material acts as a half wave retarder and rotates the polarisation direction to φ+2θ. The fixed half wave retarder formed by the combination of the quarter waveplate 6 and the mirror 5 rotates the direction of polarisation of the light component so that it makes an angle of −2θ−φ with respect to the direction 11. The final passage through the strip 8b rotates the polarisation direction to φ+4θ as shown at 15. Light of the orthogonal polarisation has its polarisation rotated in the same way. Thus, unpolarised light passing through the strips 8b has its polarisation rotated by +4θ, which is substantially equal to +90 degrees.

Light reflected through each of the strips 8b is out of phase by 180 degrees with respect to light passing through each of the strips 8a when the electrodes 3b and 3a are connected to receive data signals of opposite polarity. In this state, the pixel acts as a phase-only diffraction grating and the pixel operates in the diffractive mode. Because of the bistable characteristics of ferroelectric liquid crystals, it is necessary only to supply the data signals in order to switch the strips 8a and 8b to the different modes illustrated in FIG. 2.

In order for the pixel to operate in the reflective mode, it is necessary to switch either or both sets of strips 8a and 8b so that their optic axes are parallel. Unpolarised light incident on the pixel is then substantially unaffected by the ferroelectric liquid crystal material and the quarter waveplate 6 and is subjected to specular reflection by the mirror and electrode 5. Each pixel is therefore switchable between a transmissive mode, in which light is specularly reflected or "diffracted" into the zeroth diffraction order, and a diffractive mode, in which light incident on the pixel is diffracted into the non-zero diffraction orders.

Such a diffractive SLM can be used with unpolarised light and provides increased optical modulation efficiency compared with SLMs which require polarised light.

FIG. 3 of the accompanying drawings illustrates a projection display using an SLM 30 of the type shown in FIGS. 1a and 1b. The SLM 30 is illuminated by an unpolarised light source 31 via a mirror 32. A projection optical system 33 projects an image displayed by the SLM 30 onto a screen 34.

Light from the light source 31 is reflected by the mirror 32 so as to be incident normally on the SLM 30. Each pixel which is in the reflective mode reflects the incident light normally back to the mirror 32 so that the reflected light is not projected by the system 33. Thus, a "dark" pixel is imaged on the screen 34 by the system 33. Each pixel in the diffractive mode deflects the incident light into the non-zero diffraction orders, mainly into the positive and negative first orders as illustrated by light rays 35 and 36. The light from each such pixel is thus imaged to a "bright" pixel on the screen 34.

FIGS. 4a and 4b illustrate a transmissive-mode diffractive SLM including a glass substrate 1, ITO electrodes 3, and a glass substrate 2 as shown in FIGS. 1a and 1b. The SLM further comprises two ferroelectric liquid crystal layers 20 and 21 provided with alignment layers similar to the layers 4 and 7 of FIGS. 1a and 1b but not shown for the sake of clarity. The two liquid crystal cells are separated by a static half waveplate 22. The arrangement of the strip electrodes 3 permits the formation of optically aligned ferroelectric liquid crystal strips in the two layers 20 and 21 so that each strip in each of the layers 20 and 21 operates as a half wave retarder whose optic axis is switchable between plus and minus approximately 22.5 degrees with the optic axes of aligned strips in the two layers 20 and 21 being parallel to each other. This device therefore acts a transmissive SLM in which each pixel is switchable between a reflective mode, in which light passes through the pixel without deflection (equivalent to zeroth order diffraction), and the diffractive mode, in which light is deflected into non-zero diffractive orders. By disposing all of the optically active layers between the substrates 1 and 2, parallax errors are greatly reduced allowing the provision of a high resolution SLM with a useful acceptance angle for input light and with high optical modulation efficiency and high contrast ratio performance.

EP 0 378 293 discloses a passively addressed ferroelectric liquid crystal display of non-diffractive type. Driving techniques are disclosed for switching the gaps between pixels so as to improve the effective aperture ratio and the contrast ratio.

Asakura and Oka (NTT), Opt. Lett. May. 17, 1992, pp 366 et seq, "Stripe Electrodes for an Electrically Controlled Grey Scale in Ferroelectric Devices" discloses a ferroelectric liquid crystal display of non-diffractive type in which one set of electrodes is stripped. This reduces the sharpness of the switching curve and permits grey levels to be provided.

Van Haaren et al (Phillips), Liquid Crystals May. 16, 1994, pp 735 et seq, "Switching on stray electric fields in ferroelectric liquid crystal cells" discloses a ferroelectric liquid crystal display of non-diffractive type. Fringing fields are used so as to simulate a black matrix in such displays.

Nordin et al, "Applied Optics" Vol. 34, No. 19, Jul. 7, 1995, pp 3756–3763, disclose a diffractive, reflective liquid crystal display consisting of a liquid crystal layer disposed above an electrode layer. The electrode layer defines pixels in the liquid crystal layer, with each pixel being divided into a number of partial pixels. Each partial pixel contains two sets of parallel, interdigitated electrodes. The two sets of electrodes are disposed in the same plane and, in use, a voltage is applied between the two sets of electrodes so as to generate fringe fields within the liquid crystal layer. The fringe fields alter the orientation of the liquid crystal molecules and thereby modulate the refractive index of the liquid crystal so as to set up a phase diffraction grating in the liquid crystal layer. The efficiency of the diffraction grating formed in a partial pixel is dependent on the voltage applied between the two sets of electrodes in that particular partial pixel.

A similar device is disclosed in Kowel et al, SPIE, Vol. 2651, pp 56–67.

In these devices, however, the refractive index of the liquid crystal layer is modulated by the fringe electric field, and this is an in-plane electric field. This prior art device is therefore unsuitable for use with binary liquid crystals such as ferroelectric liquid crystals.

SUMMARY OF THE INVENTION

According to a first aspect of the invention, there is provided a diffractive spatial light modulator comprising: a plurality of picture elements, each of which comprises a plurality of first elongate parallel electrodes, a plurality of second elongate parallel electrodes interdigitated with the first electrodes, and a third electrode facing the first and second electrodes; and an address signal generator connected to the first and second electrodes and arranged to supply addressing signals for selectively switching each picture element to any one of a non-diffractive state and a plurality of diffractive states of different diffraction efficiencies.

Such an arrangement allows grey levels to be achieved in a diffractive spatial light modulator. Grey levels can be provided using binary switching, for instance of bistable liquid crystal material, in a robust and reliable manner. By providing at least some grey levels in this way, techniques known as "temporal dithering" to provide grey scale can be reduced or eliminated so that material switching speed requirements are reduced. Passive matrix or active back plane matrix addressing techniques may be used. For instance, in the case of a reflection mode modulator, the temperature of the reflective or back surface of the modulator can be accurately controlled and this improves the grey level performance in terms of repeatability and consistency of addressed grey levels.

Each of the picture elements may comprise a layer of electro-optic material.

Each of the picture elements may comprise a layer of liquid crystal material, such as a bistable material, for instance ferroelectric liquid crystal, antiferroelectric liquid crystal, or bistable twisted nematic liquid crystal.

Each picture element may form a phase-only diffraction grating in the diffractive states.

Each picture element may comprise parallel strips which are aligned with the first and second electrodes and which are switchable between first and second states whose optical paths differ by $\pi$ radians.

The mark/space ratio of the grating formed by each picture element may be different for at least some of the diffractive states. The first electrodes of each picture element may be connected together and the second electrodes of each picture element may be connected together.

The picture elements may be arranged as rows and columns, the first electrodes of the picture elements of each column may be connected together and to a data signal generator of the address signal generator, the second electrodes of the picture elements of each column may be connected together and to the data signal generator, and the third electrodes of the picture elements of each row may be connected together and to a strobe signal generator of the address signal generator. The data signal generator may be arranged to supply different data signals to the first and second electrodes of each column so as to select the diffractive states of different diffraction efficiencies. In one embodiment, the different data signals may have different amplitudes in another embodiment, the different data signals may have different phases with respect to strobe signals from the strobe signal generator. In a further embodiment, the different data signals may comprise pulses of different widths.

The grating formed by each picture element in at least some of the diffractive states may be non-periodic. At least some of the first and second electrodes of each picture element may be connected to the address signal generator independently of each other.

The picture elements may be arranged as rows and columns, the first electrodes of all of the picture elements may be connected together, the second electrodes of all of the picture elements may be connected together, the third electrode of each picture element may be connected to an output of a gate having a data input and a control input, the data inputs of the gates of each column of picture elements may be connected together and to a data signal generator of the address signal generator, and the control inputs of the gates of each row of picture elements may be connected together and to a strobe signal generator of the address signal generator. Each of the gates may comprise a thin film transistor.

According to a second aspect of the invention, there is provided a display comprising a modulator according to the first aspect of the invention, a light source for illuminating the modulator, and an optical system for gathering light from at least one non-zeroth diffraction order.

The light source may be arranged to supply unpolarised light to the modulator.

BRIEF DESCRIPTION OF THE DRAWINGS

The invention will be further described, by way of example, with reference to the accompanying drawings, in which:

FIG. 1b is a cross sectional diagram of the modulator of FIG. 1a;

FIG. 3 is a schematic diagram of projection display using a modulator of the type shown in FIGS. 1a and 1b;

FIG. 4b is a cross sectional diagram of the modulator of FIG. 4a;

Like reference numerals refer to like parts throughout the drawings.

DETAILED DESCRIPTION OF THE INVENTION

Figure 1A:
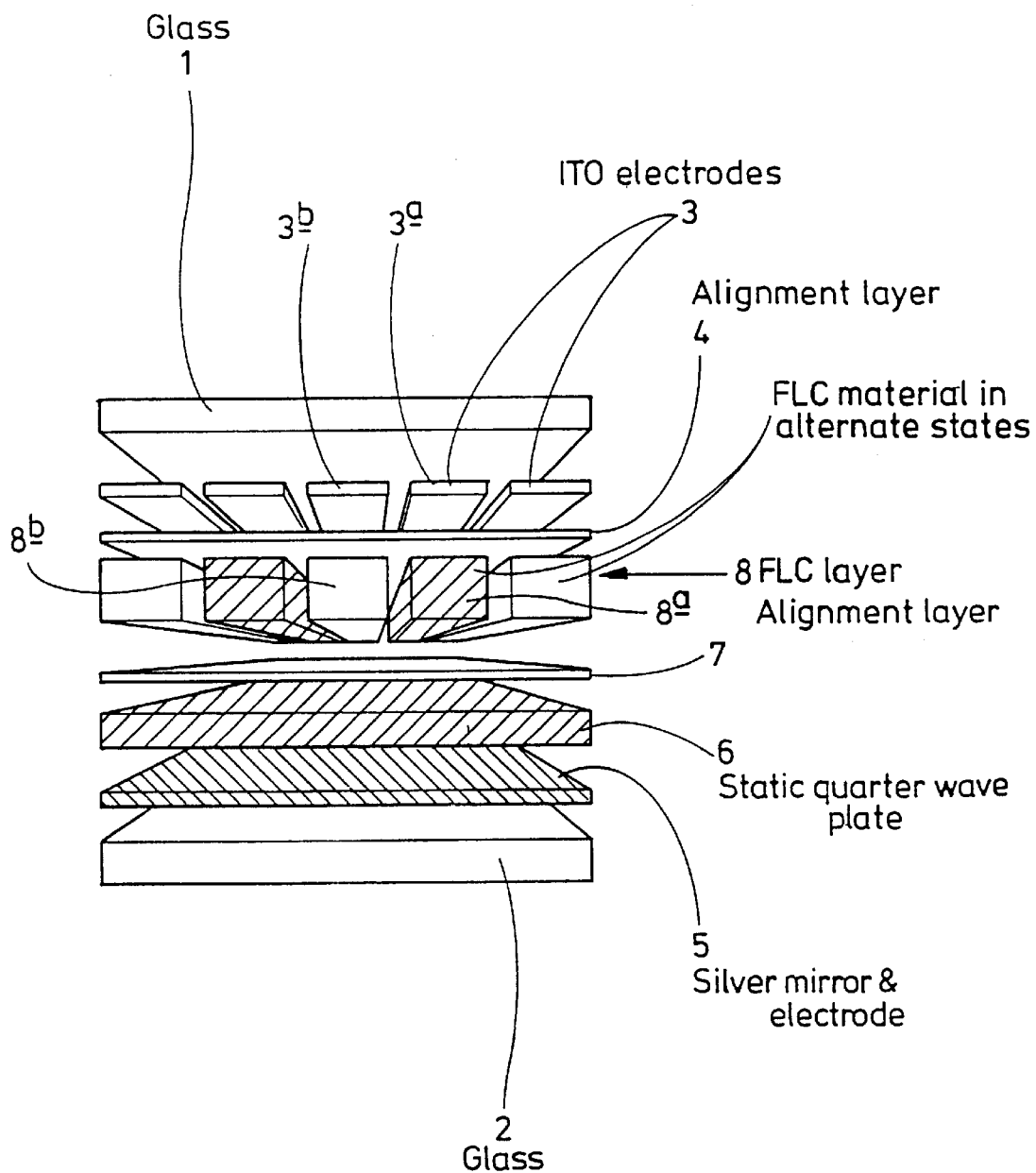
FIG. 1a is an exploded view of a spatial light modulator of known type.
Figure 1B:
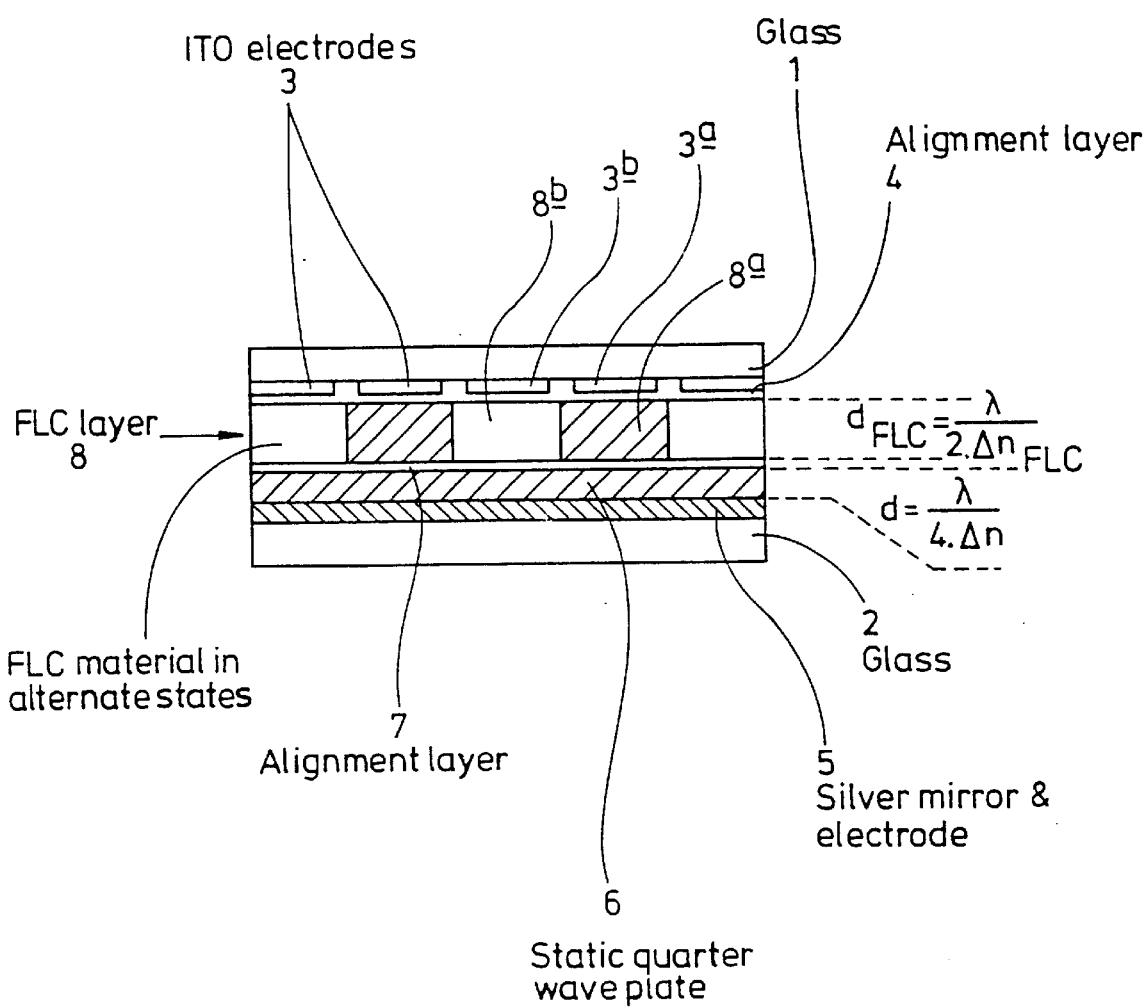
Figure 2:
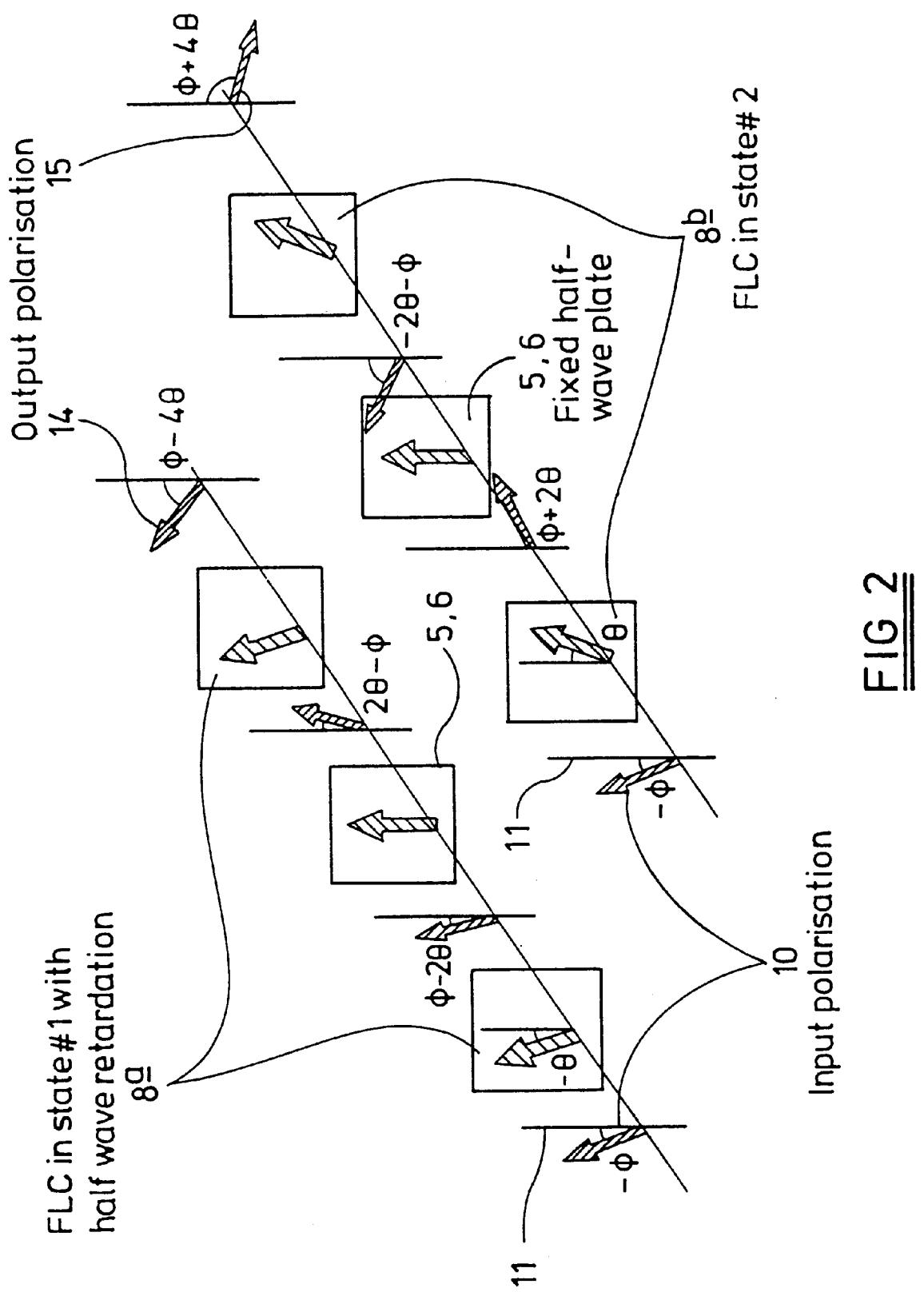
FIG. 2 is a diagram illustrating operation of the modulator of FIGS. 1a and 1b.
Figure 4A:
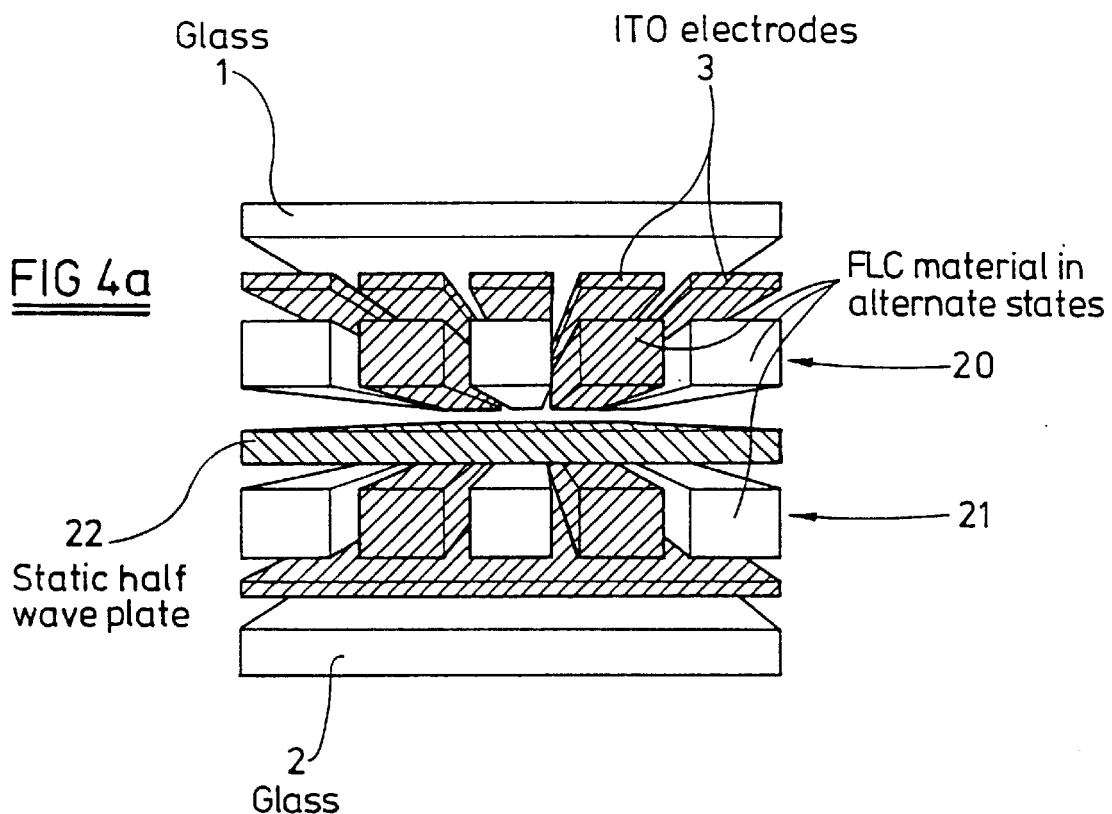
FIG. 4a is an exploded view of another spatial light modulator of known type.
Figure 4B:
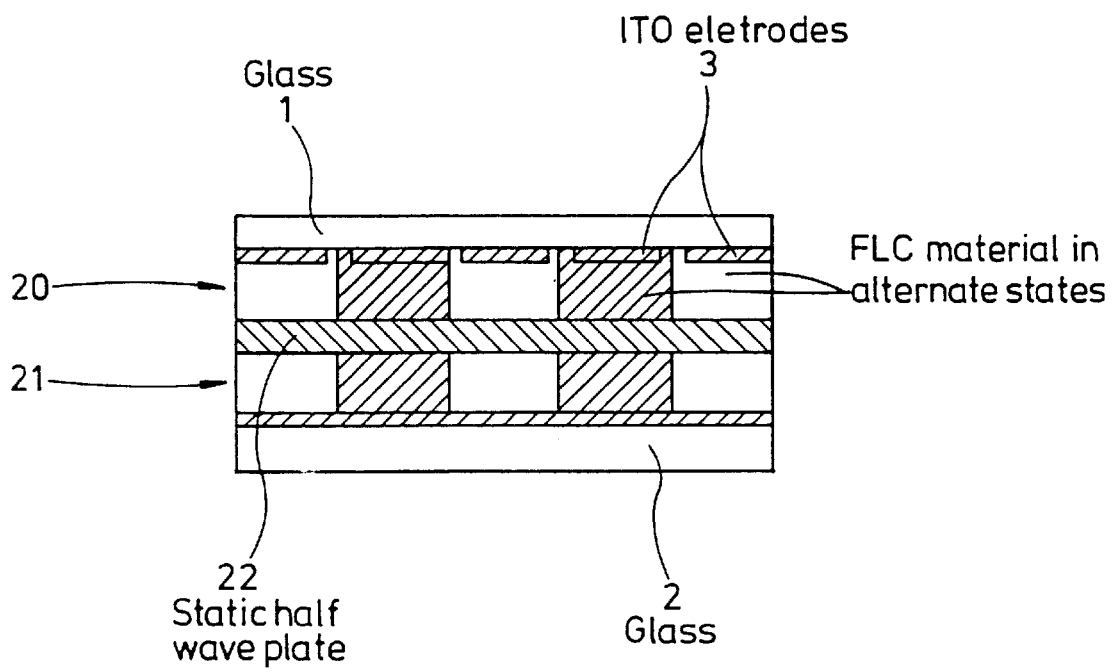
Figure 5:
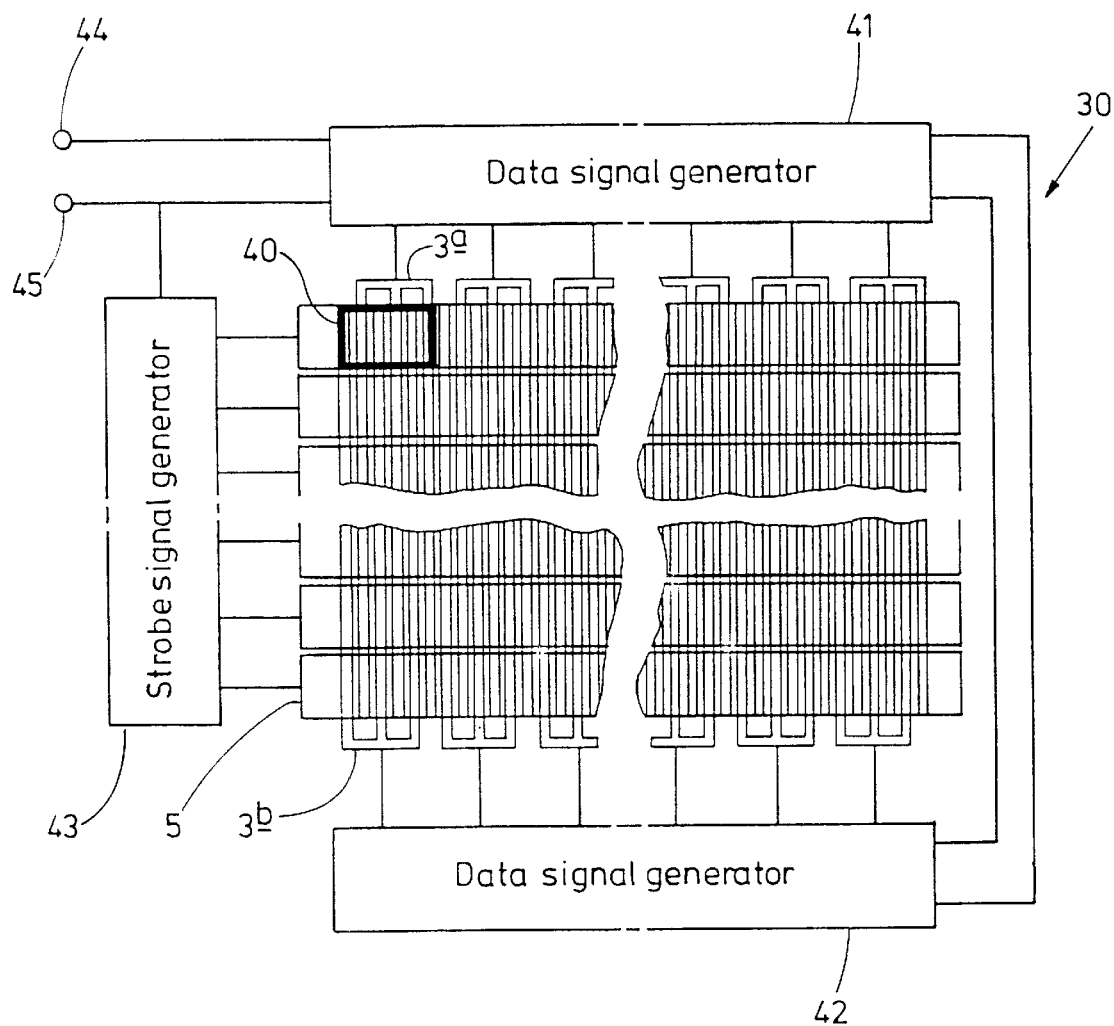
FIG. 5 is a diagrammatic plan view of a spatial light modulator constituting an embodiment of the invention.

FIG. 5 of the accompanying drawings shows an SLM 30 comprising pixels such as 40 of the type shown in FIGS. 1a and 1b. The SLM comprises a rectangular array of pixels in a passive matrix addressing arrangement. In particular, the first data electrodes 3a extend throughout the pixel columns with the first electrodes of each column being connected together and to a respective output of a data signal generator 41. Similarly, the second data electrodes 3b extend throughout the pixel columns and the second data electrodes of each column are connected together and to a respective output of a data signal generator 42. The third or strobe electrodes 5 extend throughout rows of pixels and are connected to a strobe signal generator 43.

The data signal generators 41 and 42 are effectively two parts of a common data signal generator but are shown as physically distinct items for clarity of illustration in FIG. 5. The data signal generators 41 and 42 may be located on opposite sides of the array of pixels for convenience of electrode connections, in particular so as to allow all of the first and second electrodes 3a and 3b to be connected to data signal generator outputs in a common plane while maintaining symmetrical electrical characteristics. Alternatively, a single data signal generator may be provided at one side, such as the top, of the array of pixels. The data signal generators 41 and 42 and the strobe signal generator 43 together constitute an address signal generator. A first input 44 receives a signal representing images to be displayed and is connected to the data signal generators 41 and 42. A second input 45 receives timing signals and is connected to the data signal generators 41 and 42 and to the strobe signal generator 43 for controlling the timing of refreshing of the pixels with fresh image data. The image data may, for instance, comprise serial data in the form of an analogue video signal or a digital video signal and are entered a row at a time in the data signal generators 41 and 42. After each row of fresh image data has been entered in the data signal generators, the strobe signal generator 43 supplies a strobe signal to the row of pixels to be refreshed. The row of image data is thus entered simultaneously in the row of pixels. This operation is repeated for each row in sequence until the whole image frame has been refreshed. The whole procedure is then repeated for each frame of image data.

Figure 6:
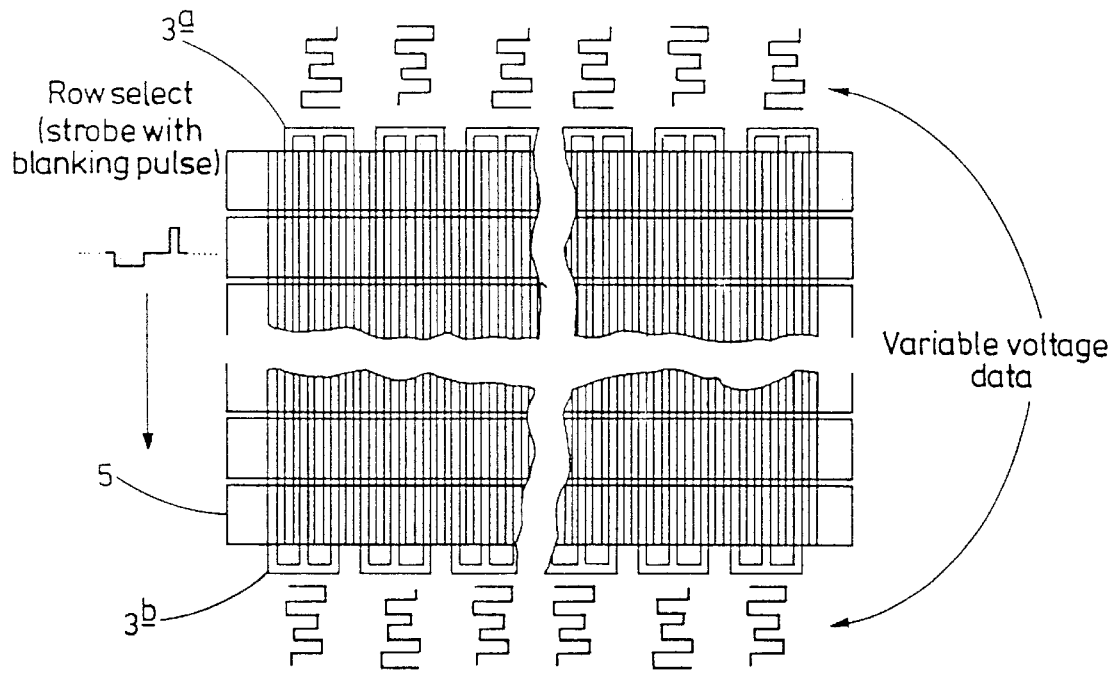
FIG. 6 is a schematic diagram of the pixel array of FIG. 5 illustrating examples of waveforms.
Figure 7A:
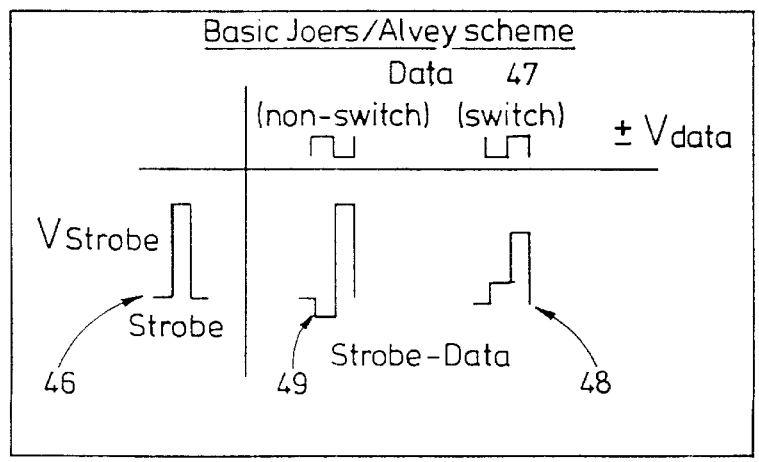
FIG. 7a illustrates a known set of addressing waveforms.

FIG. 6 shows the array of pixels of FIG. 5 with typical data and strobe signal waveforms. These are of the type used in the JOERS/Alvey addressing scheme as disclosed in P. W. H. Surguy et al, Ferroelectrics 122, 63, 1991, the contents of which are hereby incorporated by reference, and are illustrated in FIG. 7a. Alternatively, the Malvern scheme may be used as disclosed in J. R. Hughes, E. P. Raynes, Liquid Crystals 13,597, 1993, the contents of which are hereby incorporated by reference. As shown in FIG. 6, the strobe signals supplied in sequence to the strobe electrodes 5 comprise a blanking pulse for resetting all of the pixels of the row to a first state followed by a strobe pulse as illustrated at 46 in FIG. 7a. The first and second data electrodes 3a and 3b receive bipolar data pulses as illustrated at 47 in FIG. 7a. The ferroelectric liquid crystal is operated in a binary mode i.e. it is switched between two well-defined states, and is bistable in that it remains in either binary state after removal of the strobe signal. The data signals comprise switching and non-switching pulses which combine with the strobe pulses to form a switching or non-switching electric field across each pixel as illustrated at 48 and 49, respectively, in FIG. 7a. Thus, ferroelectric liquid crystal which has applied across it an electric field with the switching waveform is switched from the state to which it was blanked by the preceding blanking pulse to the other binary stable state. On the other hand, ferroelectric liquid crystal across which the electric field having the non-switching waveform is applied remains in the state to which it was switched by the preceding blanking pulse.

Figure 7B:
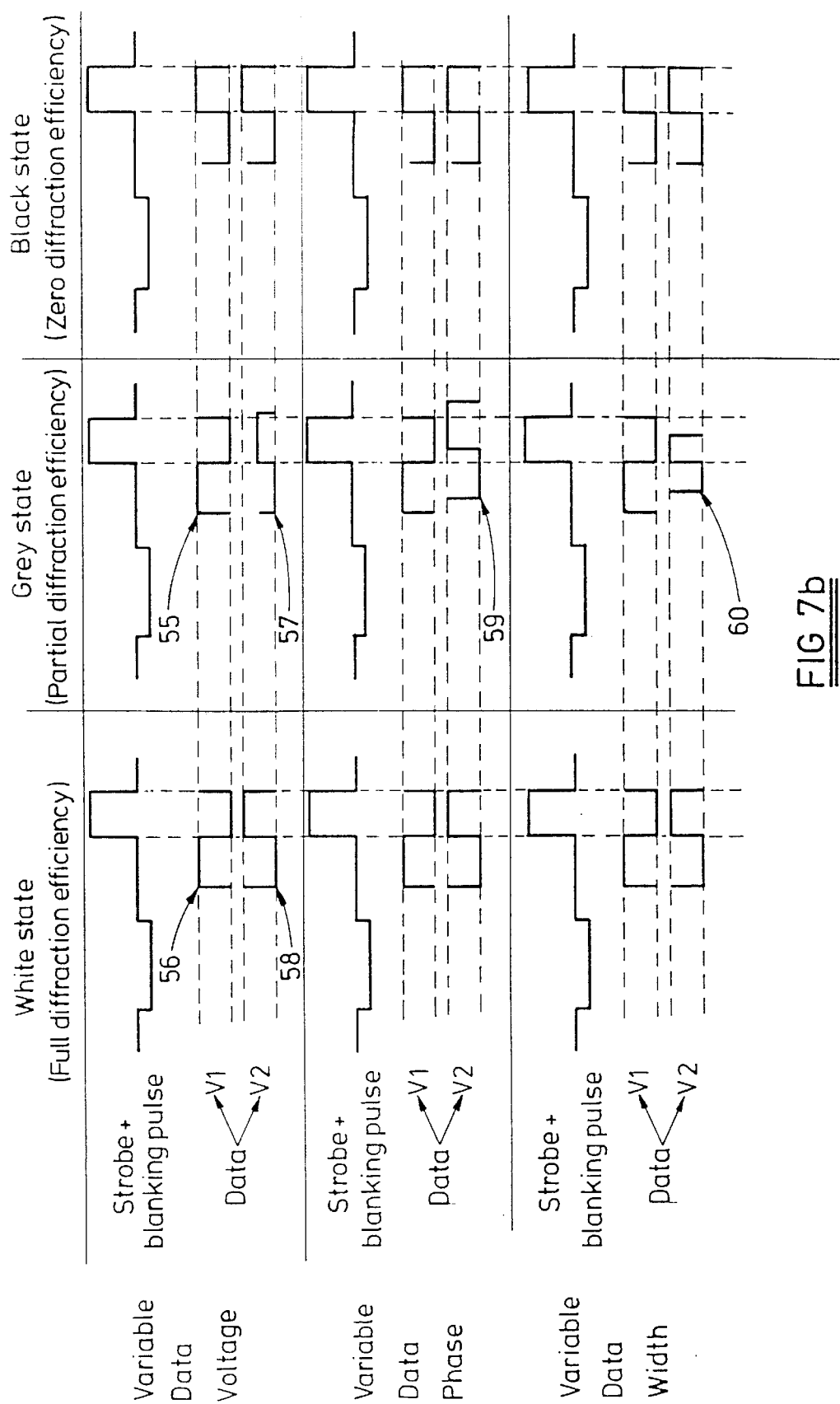
FIG. 7b illustrates three types of addressing waveforms which may be used in the modulator of FIG. 5.

FIG. 7b illustrates three types of modified JOERS/Alvey type waveforms which may be used to address grey levels in the SLM 30 of FIG. 5. The data signals labelled V2 and V1 are supplied to the first and second electrodes 3a and 3b, respectively. Waveforms for achieving a fully diffracting (white) pixel state, a partially diffracting (grey) pixel state, and a zero- or non-diffracting (black) pixel state are shown.

The top row of waveforms achieves grey levels by varying the voltage or amplitude of the data signals on one of the first and second electrodes 3a and 3b and corresponds to the waveforms shown schematically in FIG. 6. Thus, in order to select a typical grey level, the data signal V1 supplied to the first electrodes 3a and shown at 55 is the same as that shown at 56 for achieving full diffraction whereas the data signal V2 supplied to the second electrodes 3b and shown at 57 is of reduced amplitude compared with that shown at 58 for achieving full diffraction.

The middle row of waveforms achieves grey levels by varying the phase of at least one of the data signals with respect to the strobe signals. For instance, in order to select a typical grey level, the phase of the data voltage V2 is varied as shown at 59.

The bottom row of waveforms achieves grey levels by varying the pulse widths of the data signals. For instance, in order to select a typical grey level, the pulses of the data signal V2 shown at 60 are of reduced width.

Figure 8:
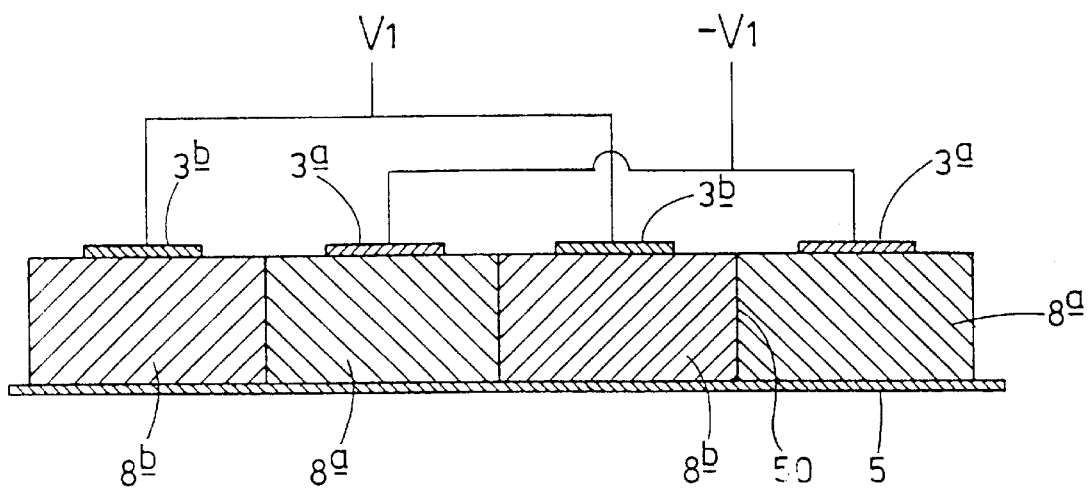
FIG. 8 is a cross sectional diagram of a pixel illustrating operation to achieve a "white" level.

FIG. 8 illustrates switching of the ferroelectric liquid crystal layer to a diffractive state, for instance as disclosed in GB 9611993.8. The data signals supplied to the first electrodes 3a and to the second electrodes 3b of the pixel have the same magnitude but are of opposite polarity. The strips 8a of ferroelectric liquid crystal below the first electrodes 3a are thus switched to a first of the binary bistable states whereas the strips 8b of ferroelectric liquid crystal below the second electrodes 3d are switched to the other state. The first and second electrodes 3a and 3b are of substantially constant pitch and substantially constant width so as to provide symmetrical switching such that the ferroelectric strips 8a and 8b are of substantially the same width. A phase-only diffraction grating is thus formed with a constant spatial pitch a mark/space ratio of 1. A grating having a mark/space ratio of 1 gives maximum efficiency of diffraction of light away from the zeroth diffraction order into the non-zero diffraction orders. In particular, the maximum theoretical efficiency of diffraction into one of the two first diffraction orders is 40.5 percent.

Figure 9:
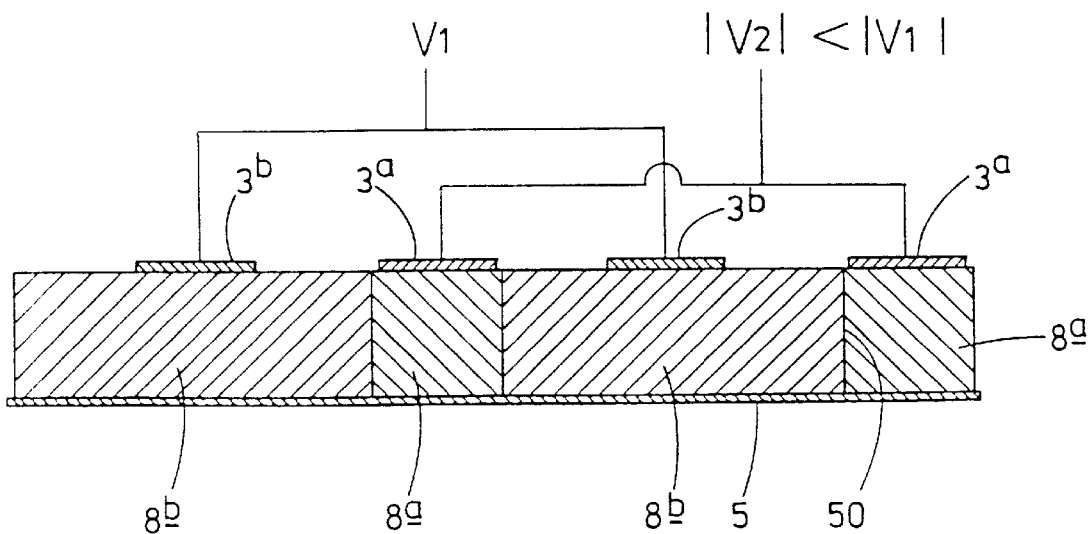
FIG. 9 is a diagrammatic cross section of a pixel illustrating operation to achieve a "grey" level by mark/space ratio modulation.

FIG. 9 illustrates the effect of applying data signals to the first and second electrodes of different magnitudes such that the data pulses applied to the first electrodes 3a are of smaller magnitude than the data pulses applied to the second electrodes 3b. In this case, the ferroelectric strips 8a are narrower than the ferroelectric strips 8b. Thus, a phase-only diffraction grating having the same constant spatial pitch as that illustrated in FIG. 8 is formed. However, the mark/space ratio of the grating shown in FIG. 9 is different from one. Because the grating is of the phase-only type, the mark/space ratio may be taken as the ratio of the width of each region 8a to the width of each region 8b or as the ratio of the width of each region 8b to the width of each region 8a. The diffraction efficiency of the grating is therefore reduced compared with that of a grating having a mark/space ratio of 1. The efficiency of diffraction into one of the first orders is plotted against mark/space ratio in the graph of FIG. 10.

Providing the data pulse voltages are such that the switching angle of the ferroelectric liquid crystal is close to maximum, the relative magnitudes of the data voltages applied to the first and second electrodes 3a and 3b can be varied so that the fields between the interdigitated first and second electrodes and the electrode 5 vary the position of domain walls, such as 50, while maintaining binary switching of the ferroelectric liquid crystal.

The voltages of the data signals are chosen so as to ensure reliable mark/space adjustment while maintaining an operating point inside a drive window such that discrimination between switching and non-switching data signals is preserved. For a modulator of the type described hereinbefore with reference to FIGS. 1a and 1b, the amplitude of typical data signals would be between 8 and 12 volts for a strobe signal voltage of 20 to 25 volts, although exact values depend on various parameters such as the actual liquid crystal material used and the number of grey levels required.

Figure 10:
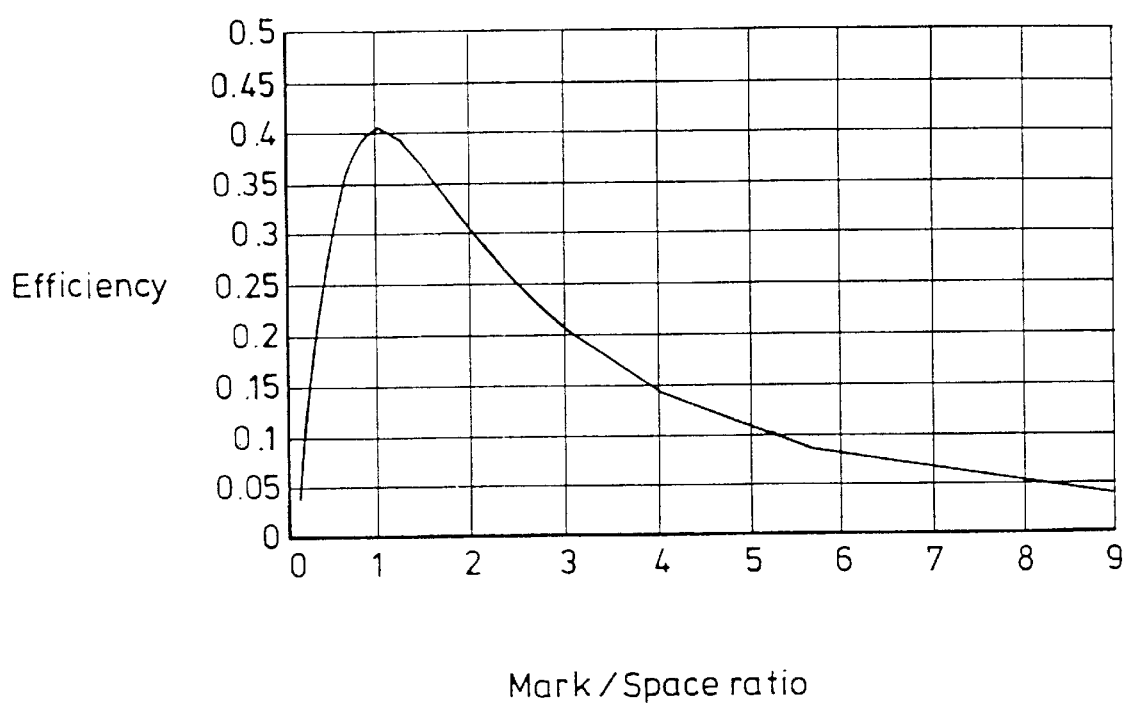
FIG. 10 is a graph of efficiency against mark/space ratio obtained by calculation.

By varying the mark/space ratio of the grating, the efficiency of diffraction into the first orders varies as illustrated in FIG. 10 (the calibrations on the vertical axis should be multiplied by 100 to give efficiency in percent). It is thus possible to provide several grey levels while using binary switching of the ferroelectric liquid crystal between uniform states. This has substantial advantages in terms of temperature stability of addressing grey levels compared with other known techniques requiring partial (i.e. non-binary) switching, for which sophisticated temperature compensation schemes are necessary. This allows the use of binary bistable materials such as ferroelectric liquid crystals, which have several advantages for high brightness projection displays of the type shown in FIG. 3, such as in-plane switching and inherent bistability which can lead to better diffraction grating fidelity.

In order to maintain DC balance of the waveforms applied to each ferroelectric liquid crystal strip, each frame of image data may be applied twice in sequence with the polarities of all data and strobe signals being inverted for the second application of the image data. Inverting the states of all ferroelectric liquid crystal strips 8a and 8b has no effect on the displayed image because dark pixels are achieved where all strips are in the same state and non-dark states are achieved where the strips are in different states. For a given switching speed of the ferroelectric liquid crystal, this halves the effective video frame rate of the display. To avoid such halving of the maximum frame rate, consecutive image frames may be displayed with strobe and data signals of opposite polarities. This does not provide absolutely accurate DC balancing but generally achieves adequate results so as to avoid degradation of the ferroelectric liquid crystal.

Figure 11:
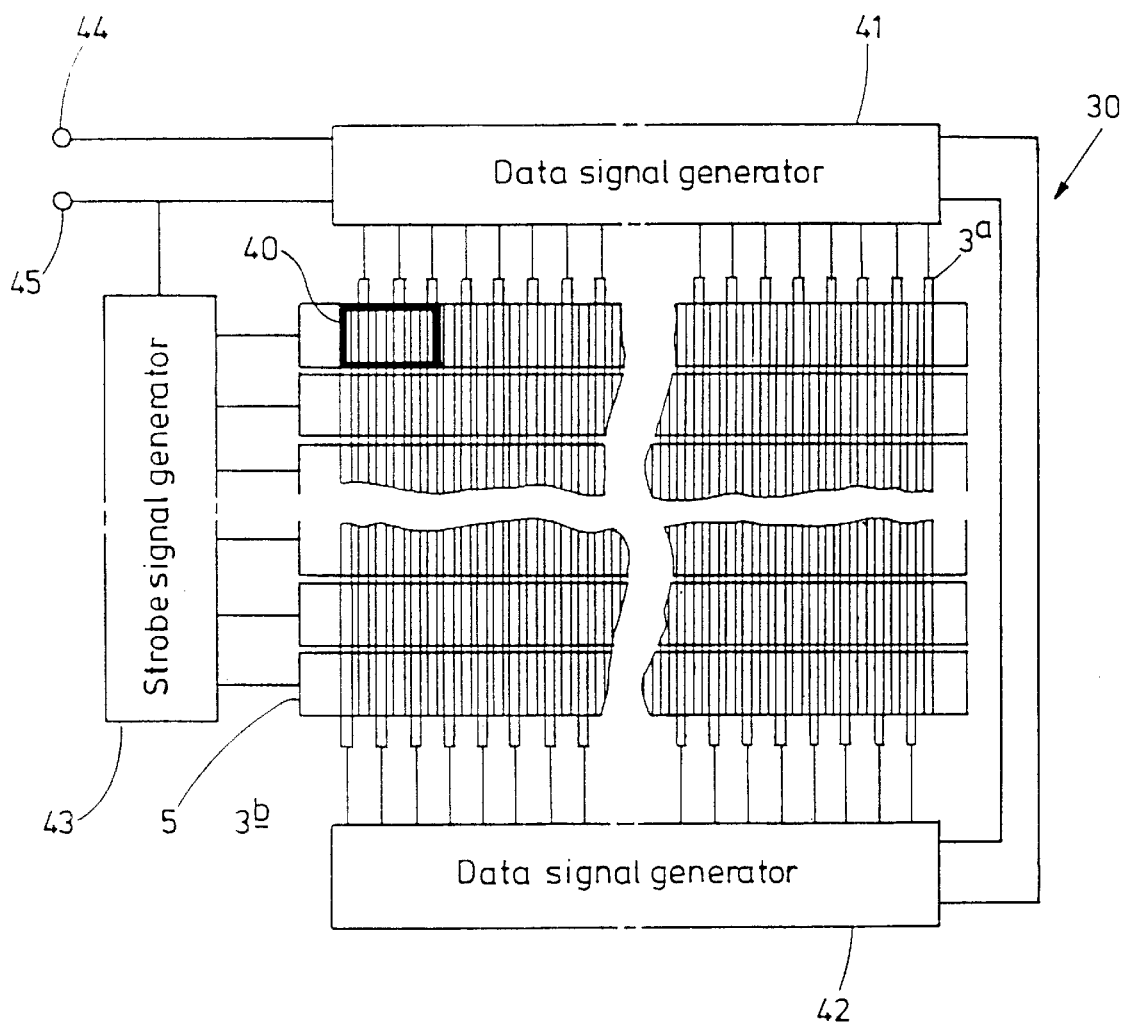
FIG. 11 is a diagrammatic plan view of a spatial light modulator constituting another embodiment of the invention.
Figure 12:
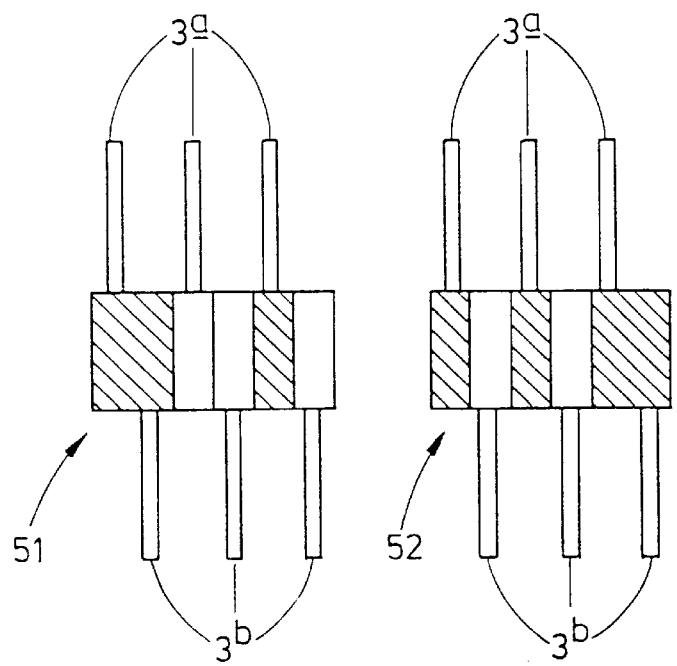
FIG. 12 illustrates non-periodic gratings which may be formed at each pixel of the modulator of FIG. 11.

FIG. 11 illustrates another passively addressed embodiment which differs from that shown in FIG. 5 in that it has a modified form of connection of the first and second data electrodes 3a and 3b. In this embodiment, the first electrodes 3a of each column of pixels are not connected together but instead are individually connected to respective outputs of the data signal generator 41. Similarly, the individual second data electrodes 3b are individually connected to respective outputs of the data signal generator 42. The states of all of the ferroelectric strips 8a and 8b may therefore be independently controlled and this allows the pixels to be switched to form non-periodic gratings as illustrated at 51 and 52 in FIG. 12.

Where each pixel has a total of n first and second interdigitated electrodes 3a and 3b, there are $2^n$ combinations of states for the ferroelectric liquid crystal strips 8a and 8b (the two states are indicated by shading and lack of shading in FIG. 12). These correspond to diffraction gratings of different efficiencies. For the case where n is 6 giving sixty four combinations, the diffraction efficiencies obtained for all such combinations are illustrated in increasing order of efficiency in the graph of FIG. 13. The efficiency is given relative to maximum efficiency which, as described hereinbefore, is an absolute efficiency of 40.5 percent into each first diffraction order for a grating as illustrated in FIG. 8 with alternate ferroelectric liquid crystal strips in different states with a mark/space ratio of 1 i.e. the finest pitch periodic grating achievable for that electrode arrangement. This "most efficient" pixel state is labelled 63 on the horizontal axis in FIG. 13.

Figure 13:
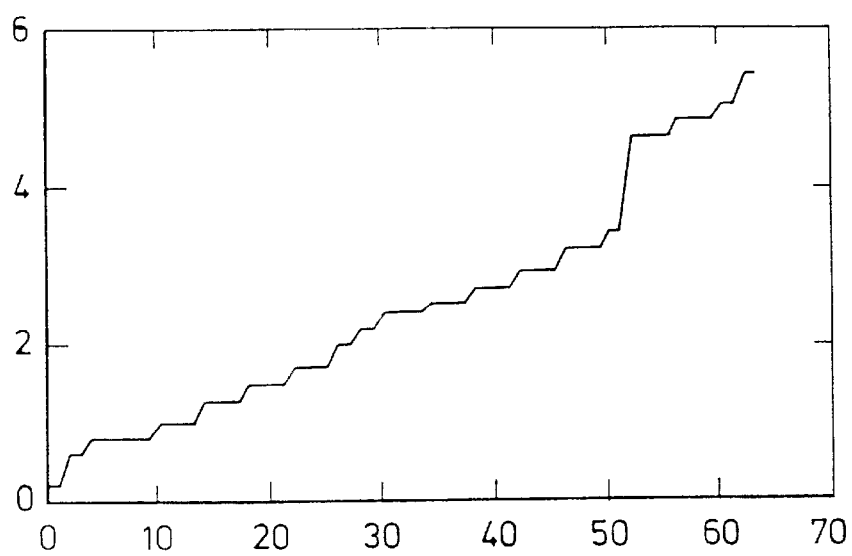
FIG. 13 is a graph of efficiency in arbitrary units for combinations of states of ferroelectric liquid crystal strips of the pixels of FIG. 11 with the combinations numbered in order of increasing efficiency.

The diffraction efficiencies illustrated in FIG. 13 provide reasonable continuity of grey levels and permit a large number of grey levels to be addressed reliably. Discontinuities may be substantially overcome by using fewer grey levels or by increasing the number of interdigitated first and second electrodes per pixel. Because this technique does not rely on fringe field switching as does the mark/space ratio modulation technique disclosed hereinbefore, more reliable grey level performance may be achieved. However, the number of drivers in the data signal generators 41 and 42 is increased because each first and second electrode requires an individual driver so that the number of drivers is increased by a factor of n/2.

It is also possible to combine the mark/space ratio modulation technique with the non-periodic grating technique so as to increase further the number of reliably addressable grey levels.

The active addressing techniques disclosed in GB 9702076.2 (the contents of which are incorporated herein by reference) may be used in place of the passive addressing technique described hereinbefore. For instance, the grating mark/space ratio may be modulated by varying the voltages on the pixel pads.

Figure 14:
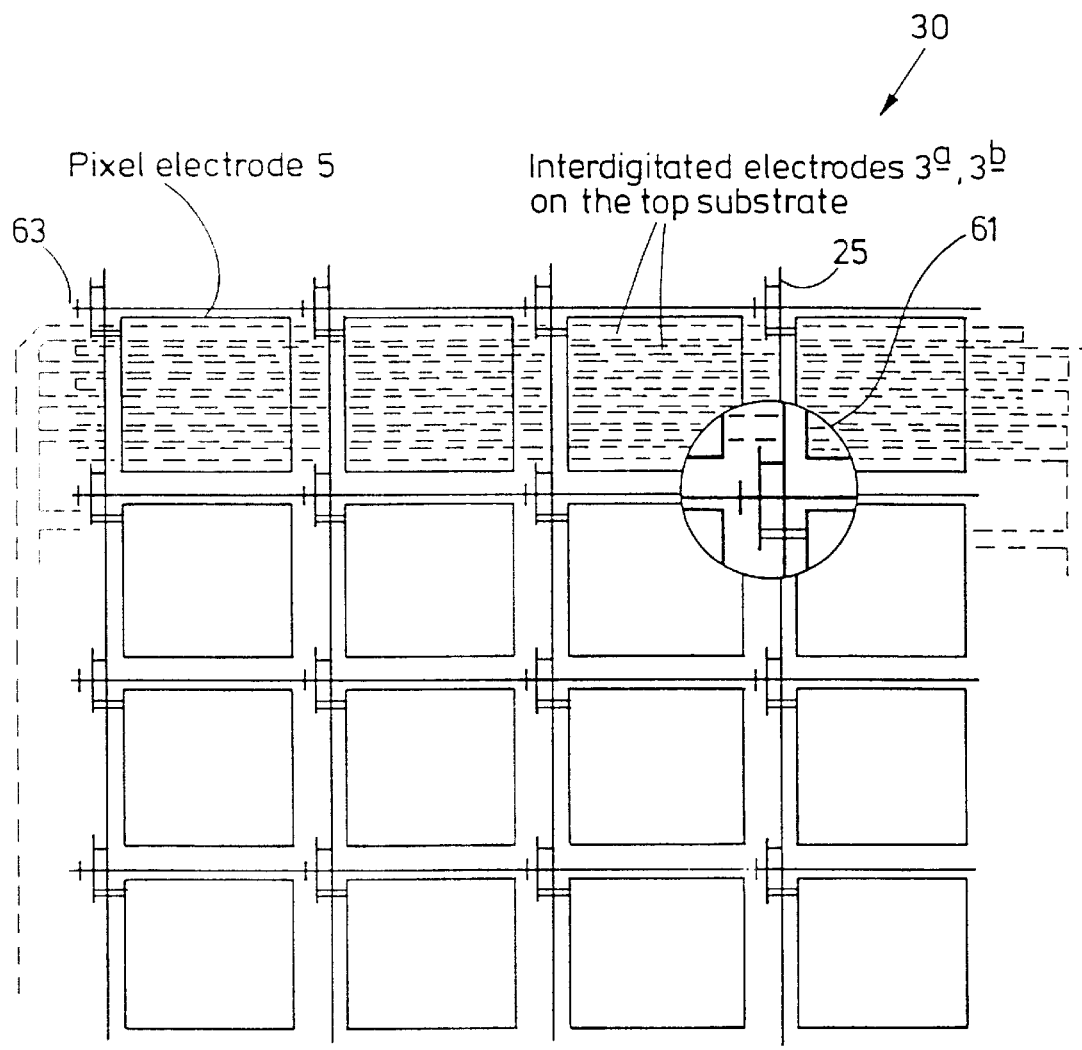
FIG. 14 is a diagrammatic plan view of a spatial light modulator constituting a further embodiment of the invention.

FIG. 14 illustrates the electrode structures of an SLM 30 having active matrix addressing. The address generator is not shown in FIG. 14 for the sake of clarity. The top substrate carries two sets of interdigitated transparent electrodes 3a and 3b, for instance made of indium tin oxide (ITO). The electrodes 3a and 3b are elongate or strip-shaped and are parallel with each other. The electrodes of each set are connected together and are interdigitated with the electrodes of the other set so that only two connections are required to the top substrate.

The bottom substrate carries a rectangular array of pixel electrodes such as that shown at 5. As shown in FIG. 14, each pixel electrode 5 faces a plurality of the interdigitated transparent electrodes 3a and 3b. An active matrix addressing scheme is provided for individually controlling the pixel electrodes 5 and a pixel element of the addressing arrangement is shown diagrammatically to an enlarged scale at 61. In the arrangement illustrated, each pixel electrode 5 is connected to the source of a thin film transistor (TFT) in the form of a pixel field effect transistor (FET). Each FET acts as a gate for the associated pixel. The pixels are arranged as rows and columns with the drains of the transistors of each column being connected to a respective column or data electrode 62 connected to a data signal generator (not shown) and the gates of the transistors of each row being connected to a respective row or scan electrode 63 connected to a strobe signal generator (not shown). The pixels are thus enabled one row at a time so that image data for a complete row are written simultaneously. The addressing arrangement illustrated schematically in FIG. 14 is thus of the conventional dynamic random access memory (DRAM) type and may, for instance, be fabricated on a silicon bottom substrate (in the case of a reflective display) or in the form of silicon on glass (for a transmissive display). The addressing arrangement may thus be substantially conventional and may be fabricated using substantially conventional techniques.

Figure 15:
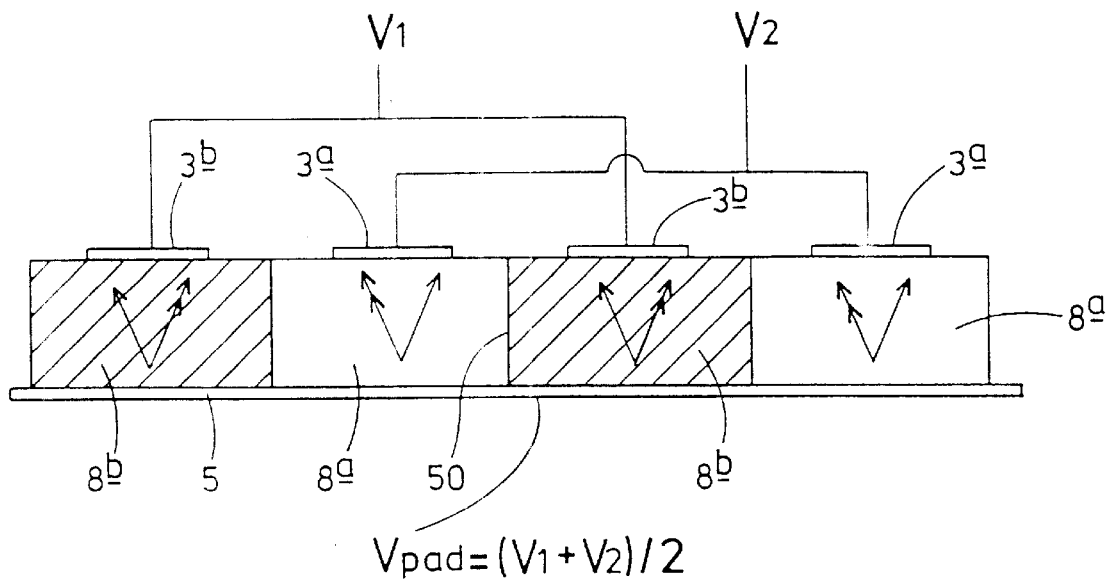
FIG. 15 is a cross sectional diagram of a pixel of the modulator of FIG. 14 illustrating operation to achieve a "white" level.
Figure 16:
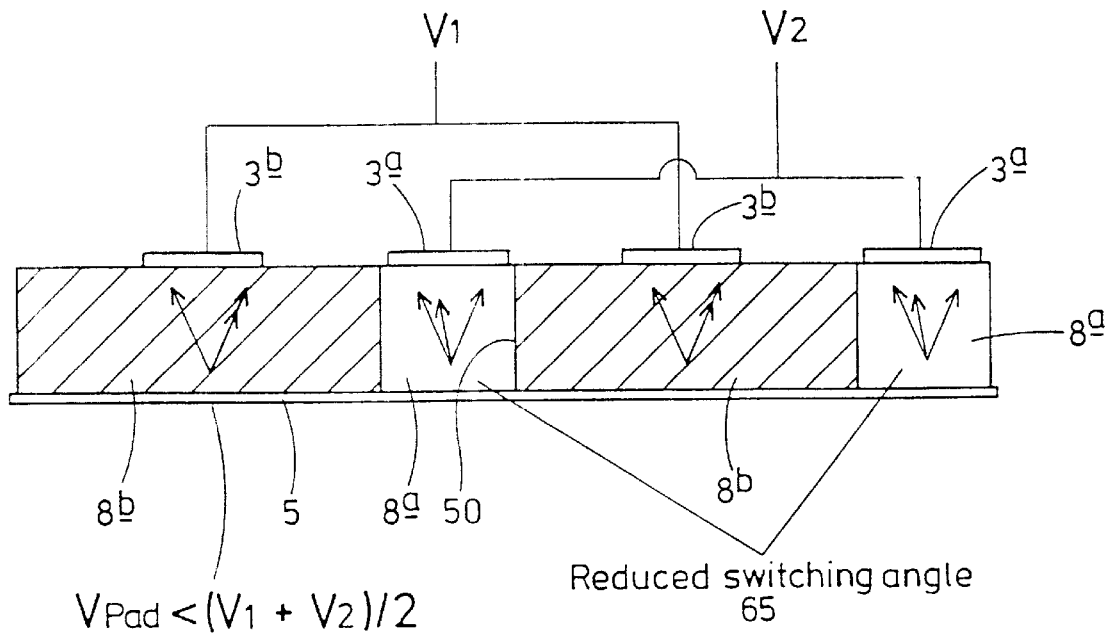
FIG. 16 is a cross sectional diagram of a pixel of the modulator of FIG. 14 illustrating operation to achieve a "grey" level.

FIGS. 15 and 16 illustrate the cross-sectional structure and operation of each pixel of the SLM 30 shown in FIG. 14. The electrodes 3a and 3b are connected to receive fixed but different voltages V2 and V1, respectively. The pixel electrode 5 receives a voltage $V_{pad}$ from the active matrix addressing circuitry which determines the optical state of the pixel. FIG. 15 illustrates the application of a voltage to the pixel electrode 5 which is midway between the voltages V1 and V2 on the interdigitated electrodes 3a and 3b. In this mode of operation, the strips 8a and 8b are fully switched so that the pixel behaves as described hereinbefore with reference to FIG. 8.

FIG. 16 illustrates operation of the pixel for a pixel electrode voltage $V_{pad}$ which is less than the average of the voltages V1 and V2 on the interdigitated electrodes 3a and 3b. Operation in this state provides a grey level because the pixel operates as a diffraction grating having the same constant pitch as that illustrated in FIG. 15 but of reduced efficiency of diffraction. In this case, the electric field applied across the strips 8b of FLC is sufficient to switch fully the optic axis of the material to one of its stable states. However, the strips 8a of FLC experience a reduced field which, it is believed, results in two coupled effects giving rise to the reduced diffraction efficiency. The first effect is that the domain walls such as 50 are displaced so as to provide a diffraction grating whose mark/space ratio is different from one. The second effect is that the applied electric field is insufficient to saturate the switching of the optic axis which therefore undergoes a reduced switching angle as illustrated at 65. Thus, the difference in phase between light passing through the strips 8a and light passing through the strips 8b is different from π radians, which reduced the efficiency of diffraction.

In the case of an FLC it is believed that the first effect—the movement of the domain walls—is more important than the second effect (that is, the reduced switching angle of the optic axis of the FLC).

An FLC is generally described as a "bistable" material. However, as can be seen from the discussion of FIG. 16 above, the FLC in FIG. 16 is not acting as in a true bistable manner, since it has access to more than two stable states. The additional constant voltage drive provided by the pixel electrodes 5 allows access to a range of switching angles for the optic axis of the FLC around the switching angles for the two bistable states illustrated in FIG. 15. The word "bistable" as used in the specification and claims is not limited to the "true bistable" behaviour in which the optic axis can be oriented only in one of the two directions illustrated in FIG. 15; the term "bistable" as used in this application is intended also to cover the "modified bistable" behaviour illustrated in FIG. 16 in which there is additional voltage dependent phase control around the two bistable states.

The active matrix embodiment illustrated in FIGS. 14 to 16 uses an FLC. However, other bistable liquid crystal materials could be used in place of an FLC. For example, the liquid crystal layer could consist of an anti-ferroelectric liquid crystal material (AFLC). In the case of an AFLC, controlling the voltage $V_{pad}$ applied to the pixel electrodes 5 enables the efficiency of the diffraction grating to be controlled in a manner similar to the FLC case described above. Varying the voltage applied to the pixel electrodes will give rise to the two effects described above which influence the diffraction efficiency of the diffraction grating—that is, movement of the domain walls 50 to alter the mark/space ratio of the diffraction grating, and a reduction in the switching angle of the optic axis of the liquid crystal molecules. However, use of an AFLC provides an additional benefit, namely that of stable domain switching operation. As a result of domain averaging, a greater range of effective grating phase depths can be achieved. The effect on the diffraction grating efficiency of domain switching is believed to be more important than effects due to varying the mark/space ratio of the grating or of varying the switching angle.

The alignment direction of the AFLC mode is preferably perpendicular to the grating so that domain growth fronts are parallel to the grating electrodes 3a, 3b. In this way, as the voltage applied to the pixel electrodes 5 is increased, the domain growth acts to modify both the depth of the grating and subsequently the grating mark/space ratio. The AFLC is preferably a thresholdless AFLC, in which the voltage-transmissivity relationship does not exhibit the typical hysteretic loop.

It is also possible to use an AFLC in a passively addressed modulator. In this case, the more typical hysteretic AFLC voltage-transmissivity relationship is required. (The use of a AFLC having such a voltage transmission characteristic with a holding voltage to provide passive matrix operation is known). In the case of a modulator of the present invention, this voltage dependent characteristic allows the diffraction grating efficiency to be controlled as a result both of variations in the grating phase depth, owing to domain growth, and of variations in the mark/space ratio of the diffraction grating as described above.

A modulator of the present invention can also be embodied using a bistable twisted nematic liquid crystal (BTN) in an active matrix driving mode. For example, a cholesteric doped nematic liquid crystal material having a pitch of roughly twice the cell gap in an anti-parallel aligned cell produces a splayed 180° twist state, and two splay-free metastable states with 0° and 360° twist. The two metastable states provide a bistable mode of operation for the liquid crystal. The liquid crystal can be switched between the metastable states by applying, firstly, a reset pulse which produces a temporary homeotropic state, followed by a select pulse to select one of the two metastable states. Varying the voltage magnitude and temporal duration of these pulses allows the mark/space ratio of the diffraction grating defined in the liquid crystal to be controlled, in a manner similar to the FLC and AFLC embodiments described above.

The present invention could also be embodied using a BTN liquid crystal addressed in a passive matrix manner.

SLMs having grey scale capability as disclosed hereinbefore have many applications in addition to use in displays, for instance of the type shown in FIG. 3. For instance, such SLMs may be used to perform beam steering as disclosed in GB 9616190.6.

What is claimed is:

1. A diffractive spatial light modulator comprising: a plurality of picture elements, each of the plurality of picture elements, comprising a plurality of first elongate parallel electrodes, a plurality of second elongate parallel electrodes interdigitated with the first electrodes and a third electrode, facing the first and second elongate parallel electrodes; and an address signal generator connected to the first and second elongate parallel electrodes and arranged to supply addressing signals for selectively switching each of the plurality of picture elements to any one of a non-diffractive state and a plurality of diffractive states of different diffraction efficiencies.

2. A modulator as claimed in claim 1, in which each of the plurality of picture elements comprises a layer of electro-optic material.

3. A modulator as claimed in claim 1, in which each of the plurality of picture elements comprises a layer of liquid crystal material.

4. A modulator as claimed in claim 3, in which the liquid crystal material is bistable.

5. A modulator as claimed in claim 4, in which the liquid crystal material is a ferroelectric liquid crystal.

6. A modulator as claimed in claim 4, in which the liquid crystal material is an antiferroelectric liquid crystal.

7. A modulator as claimed in claim 4, in which the liquid crystal material is a bistable twisted nematic liquid crystal.

8. A modulator as claimed in claim 1, in which each of the plurality of picture elements forms a phase-only diffraction grating in the diffractive states.

9. A modulator as claimed in claim 8, in which each of the plurality of picture elements comprises parallel strips which are aligned with the first and second elongate parallel electrodes and which are switchable between first and second states whose optical paths differ by $\pi$ radians.

10. A modulator as claimed in claim 8, in which a mark/space ratio of the grating formed by each of the plurality of picture elements is different for at least some of the diffractive states.

11. A modulator as claimed in claim 10, in which the first elongate parallel electrodes are connected together within each of the plurality of picture elements and the second elongate parallel electrodes are connected together within each of the plurality of picture elements.

12. A modulator as claimed in claim 10, in which the plurality of picture elements are arranged as rows and columns, the first elongate parallel electrodes of the of picture elements within each of the columns are connected together and to a data signal generator of the address signal generator, the second elongate parallel electrodes of the picture elements within each of the columns are connected together and to the data signal generator, and the third electrodes of the of picture elements within each of the rows are connected together and to a strobe signal generator of the address signal generator.

13. A modulator as claimed in claim 12, in which the data signal generator is arranged to supply different data signals to the first and second elongate parallel electrodes of each of the columns so as to select the diffractive states of different diffraction efficiencies.

14. A modulator as claimed in claim 13, in which the different data signals have different amplitudes.

15. A modulator as claimed in claim 13, in which the different data signals have different phases with respect to strobe signals from the strobe signal generator.

16. A modulator as claimed in claim 13, in which the different data signals comprise pulses of different widths.

17. A modulator as claimed in claim 8, in which the grating formed by each of the plurality of picture elements in at least some of the diffractive states is non-periodic.

18. A modulator as claimed in claim 17, in which at least some of the first and second elongate parallel electrodes of each of the plurality of picture elements are connected to the address signal generator independently of each other.

19. A modulator as claimed in claim 10, in which the plurality of picture elements are arranged as rows and columns, the first elongate parallel electrodes of all of the picture elements are connected together, the second elongate parallel electrodes of all of the picture elements are connected together, the third electrode of each of the plurality of picture elements is connected to an output of a gate having a data input and a control input, the data inputs of the gates of each of the columns of the plurality of picture elements are connected together and to a data signal generator of the address signal generator, and the control inputs of the gates of each of the rows of the plurality of picture elements are connected together and to a strobe signal generator of the address signal generator.

20. A modulator as claims in claim 19, in which each of the gates comprises a thin film transistor.

21. A display comprising a modulator as claimed in claim 1, a light source for illuminating the modulator, and an optical system for gathering light from at least one non zeroth diffraction order.

22. A display as claimed in claim 21, in which the light source is arranged to supply unpolarized light to the modulator.

23. A diffractive spatial light modulator, comprising:

a plurality of picture elements, each of the plurality of picture elements comprising a plurality of first elongate parallel electrodes, a plurality of second elongate parallel electrodes interdigitated with the first elongate parallel electrodes, a third electrode facing the first and second elongate parallel electrodes to define first regions between the first elongate parallel electrodes and the third electrode and second regions between the second elongate parallel electrodes and the third electrode, and a layer of electro-optic material between the first and second elongate parallel electrodes and the third electrode in the first and second regions; and an address signal generator connected to the first and second elongate parallel electrodes and the third electrode and arranged to supply addressing signals for selectively switching each of the plurality of picture elements to any one of a non-diffractive state and a plurality of diffractive states of different diffraction efficiencies, the plurality of diffractive states of different diffraction efficiencies being provided by varying the voltages provided to the first and second regions relative to each other.

* * * * *